(12) United States Patent
Shirai et al.

(10) Patent No.: US 11,519,480 B2
(45) Date of Patent: Dec. 6, 2022

(54) ELECTRIC ACTUATOR

(71) Applicant: NIDEC TOSOK CORPORATION, Kanagawa (JP)

(72) Inventors: Hiroshi Shirai, Kanagawa (JP); Tomoki Sato, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/340,074

(22) Filed: Jun. 6, 2021

(65) Prior Publication Data

US 2021/0381582 A1 Dec. 9, 2021

(30) Foreign Application Priority Data

Jun. 8, 2020 (JP) .............................. JP2020-099079

(51) Int. Cl.
*F16H 1/32* (2006.01)
*H02K 7/00* (2006.01)
*H02K 7/08* (2006.01)
*F16H 57/02* (2012.01)
*H02K 7/116* (2006.01)

(52) U.S. Cl.
CPC .............. *F16H 1/32* (2013.01); *F16H 57/02* (2013.01); *H02K 7/003* (2013.01); *H02K 7/083* (2013.01); *H02K 7/116* (2013.01); *F16H 2001/327* (2013.01); *F16H 2057/02034* (2013.01); *F16H 2057/02082* (2013.01)

(58) Field of Classification Search
CPC ...... F16H 1/32; F16H 2001/327; F16H 57/02; F16H 2057/02034; F16H 2057/02082; H02K 7/003; H02K 7/083; H02K 7/116
See application file for complete search history.

(56) References Cited

U.S. PATENT DOCUMENTS

| | | | | | |
|---|---|---|---|---|---|
| 4,225,182 | A | * | 9/1980 | Werner ................. | B60N 2/0232 297/362 |
| 9,033,840 | B2 | * | 5/2015 | Nomura ................... | B60K 1/00 475/150 |
| 9,856,943 | B2 | * | 1/2018 | Saito ........................ | F16H 1/32 |

FOREIGN PATENT DOCUMENTS

JP 2016109226 6/2016

* cited by examiner

*Primary Examiner* — Huan Le
(74) *Attorney, Agent, or Firm* — JCIPRNET (57) ABSTRACT

An electric actuator includes a motor, a speed reduction mechanism, and a bearing fixed to a motor shaft having an eccentric axis portion. The speed reduction mechanism has: an externally toothed gear, an internally toothed gear, a facing member arranged facing the externally toothed gear, and column members arranged to protrude from one member of the facing member and the externally toothed gear toward the other member and surround the motor axis. The other member has hole portions arranged to surround the motor axis. The column members are inserted into the hole portions respectively, and support the externally toothed gear to be swingable around the motor axis via an inner side surface of each of the hole portions. At least one of the column members is attached to the one member in a manner of being rotatable around a central axis of the at least one column member.

6 Claims, 4 Drawing Sheets

FIG. 4

ELECTRIC ACTUATOR

CROSS REFERENCE TO RELATED APPLICATIONS

The present invention claims priority under 35 U.S.C. § 119 to Japan Application No. 2020-099079 filed on Jun. 8, 2020, the entire content of which is incorporated herein by reference.

BACKGROUND

Technical Field

The disclosure relates to an electric actuator.

Related Art

An electric actuator having a speed reducer is known.

In the conventional speed reducer, a protruding portion protruding from the sun gear in the axial direction enters a hole portion of an output shaft. Accordingly, a rotational driving force is transmitted from the sun gear to the output shaft via the outer peripheral surface of the protruding portion and the inner peripheral surface of the hole portion. In the above configuration, when a relatively large force is applied between the sun gear and the output shaft, the position of the outer peripheral surface of the protruding portion that contacts the inner peripheral surface of the hole portion is always the same. Therefore, partial wear of the outer peripheral surface of the protruding portion is prone to occur. Consequently, failures may occur in transmission of the rotational driving force from the sun gear to the output shaft.

SUMMARY

According to an exemplary embodiment, the electric actuator of the disclosure includes a motor having a motor shaft that is rotatable about a motor axis, a speed reduction mechanism connected to the motor shaft, and a bearing fixed to the motor shaft. The motor shaft has an eccentric axis portion centered on an eccentric axis that is eccentric with respect to the motor axis. The speed reduction mechanism has an externally toothed gear connected to the eccentric axis portion via the bearing, an internally toothed gear that surrounds a radial outer side of the externally toothed gear and meshes with the externally toothed gear, an output flange portion arranged facing the externally toothed gear in an axial direction of the motor axis, and a plurality of column members arranged so as to protrude from one member of the output flange portion and the externally toothed gear toward the other member and surround the motor axis. The other member has a plurality of hole portions arranged so as to surround the motor axis. The plurality of column members are inserted into the plurality of hole portions respectively, and support the externally toothed gear to be swingable around the motor axis via an inner side surface of each of the hole portions. At least one of the plurality of column members is attached to the one member in a manner of being rotatable around a central axis of the at least one column member.

The above and other elements, features, steps, characteristics and advantages of the present disclosure will become more apparent from the following detailed description of the preferred embodiments with reference to the attached drawings.

DESCRIPTION OF THE EMBODIMENTS

A Z-axis direction in each figure is a vertical direction in which the positive side (+Z side) is the upper side and the negative side (−Z side) is the lower side. The axial direction of a motor axis J1 appropriately shown in each figure is parallel to the Z-axis direction, that is, the vertical direction. In the following description, a direction parallel to the axial direction of the motor axis J1 is simply referred to as "axial direction". In addition, a radial direction centered on the motor axis J1 is simply referred to as "radial direction", and a circumferential direction centered on the motor axis J1 is simply referred to as "circumferential direction".

Moreover, the vertical direction, the upper side, and the lower side are names for simply explaining the relative positional relationship of each portion, and the actual arrangement relationship or the like may be other arrangement relationship or the like instead of the arrangement relationship or the like indicated by these names.

Figure 1:
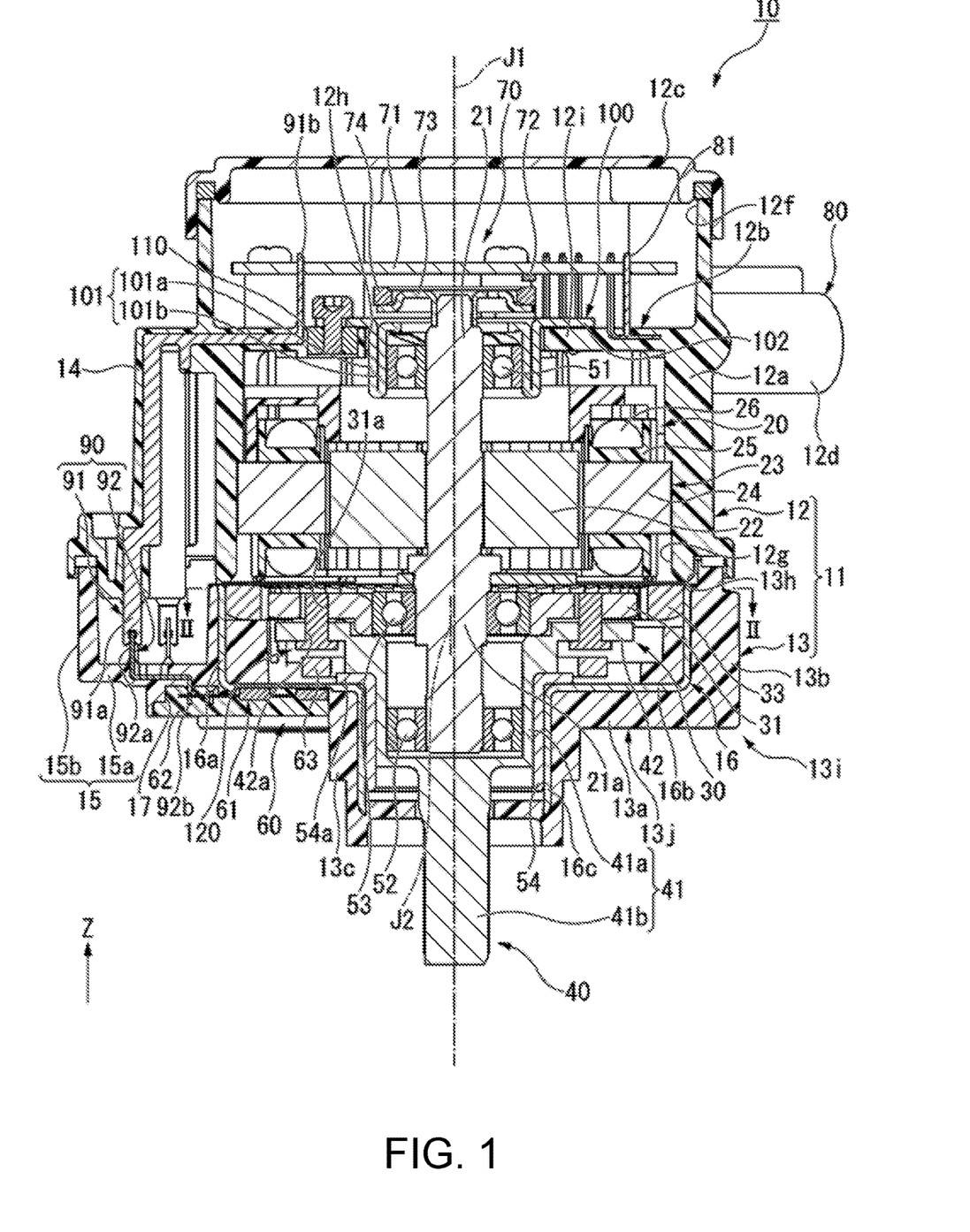
FIG. 1 is a cross sectional view showing an electric actuator of a first exemplary embodiment of the present disclosure.

An electric actuator 10 of the exemplary embodiment of the present disclosure shown in FIG. 1 is attached to a vehicle. More specifically, the electric actuator 10 is mounted on, for example, a park-by-wire actuator device driven based on a shift operation of a vehicle driver. As shown in FIG. 1, the electric actuator 10 includes a case 11, a bearing holder 100, a motor 20, a control portion 70, a connector portion 80, a speed reduction mechanism 30, an output portion 40, a wiring member 90, a rotation detection device 60, a first bearing 51, a second bearing 52, a third bearing 53, and a bush 54. The first bearing 51, the second bearing 52, and the third bearing 53 are, for example, ball bearings.

The case 11 accommodates the motor 20 and the speed reduction mechanism 30 therein. The case 11 has a motor case 12 that accommodates the motor 20 therein, and a speed reduction mechanism case 13 that accommodates the speed reduction mechanism 30 therein. The motor case 12 has a case tube portion 12a, a wall portion 12b, a control board accommodation portion 12f, an upper lid portion 12c, a terminal holding portion 12d, and a first wiring holding portion 14. Each portion of the motor case 12 comprises resin except for a metal member 110 described later.

The case tube portion 12a has a cylindrical or substantially cylindrical shape extending in the axial direction about the motor axis J1. The case tube portion 12a opens on both sides in the axial direction. The case tube portion 12a has a first opening portion 12g that opens on the lower side. That is, the motor case 12 has the first opening portion 12g. The case tube portion 12a surrounds the radial outer side of the motor 20.

The wall portion 12*b* has an annular or substantially annular shape extending from the inner peripheral surface of the case tube portion 12*a* toward the radial inner side. The wall portion 12*b* covers the upper side of a stator 23 of the motor 20 which is described later. The wall portion 12*b* has a hole portion 12*h* that penetrates the wall portion 12*b* in the axial direction. In the exemplary embodiment of the present disclosure, the hole portion 12*h* has a circular or substantially circular shape centered on the motor axis J1. The inner diameter of the hole portion 12*h* is larger than the outer diameter of a holder tube portion 101 described later. The wall portion 12*b* has a wall body 12*i* comprising resin and the metal member 110 comprising metal. The wall body 12*i* is the portion that has an annular or substantially annular shape extending from the inner peripheral surface of the case tube portion 12*a* toward the radial inner side.

The metal member 110 has an annular or substantially annular shape and has a female screw portion on the inner peripheral surface. The metal member 110 is, for example, a nut. The metal member 110 is embedded in the wall body 12*i*. More specifically, the metal member 110 is embedded in the radial inner edge portion of the wall body 12*i*. The metal member 110 is located at a position farther away from the radial outer side than the radial inner side surface of the hole portion 12*h*. The upper side surface of the metal member 110 is located above the upper side surface of the wall body 12*i*. The upper side surface of the metal member 110 is a flat surface orthogonal to the axial direction. Although not shown, a plurality of metal members 110 are arranged in the exemplary embodiment of the present disclosure. The plurality of metal members 110 are arranged at equal intervals over a circumference along the circumferential direction. For example, three metal members 110 are arranged.

The control board accommodation portion 12*f* is a portion for accommodating a control board 71 described later. The control board accommodation portion 12*f* is constituted on the radial inner side of the upper side portion of the case tube portion 12*a*. The bottom surface of the control board accommodation portion 12*f* is the upper surface of the wall portion 12*b*. The control board accommodation portion 12*f* opens on the upper side. The upper lid portion 12*c* is a plate-shaped lid or a substantially plate-shaped lid that closes the upper end opening of the control board accommodation portion 12*f*. The terminal holding portion 12*d* protrudes radially outward from the case tube portion 12*a*. The terminal holding portion 12*d* has a cylindrical or substantially cylindrical shape that opens radially outward. The terminal holding portion 12*d* holds a terminal 81 described later.

The first wiring holding portion 14 protrudes radially outward from the case tube portion 12*a*. In FIG. 1, the first wiring holding portion 14 protrudes from the case tube portion 12*a* toward the negative side (−X side) of a first direction X. The first wiring holding portion 14 extends in the axial direction. The axial position of the upper end portion of the first wiring holding portion 14 is substantially the same as the axial position of the wall portion 12*b*. The circumferential position of the first wiring holding portion 14 is different from, for example, the circumferential position of the connector portion 80.

The speed reduction mechanism case 13 is located on the lower side of the motor case 12. The speed reduction mechanism case 13 has a speed reduction mechanism case body 13*i* and a cylindrical member 16. The speed reduction mechanism case body 13*i* comprises resin. The speed reduction mechanism case body 13*i* has a bottom wall portion 13*a*, a tube portion 13*b*, a protruding tube portion 13*c*, and a second wiring holding portion 15. The bottom wall portion 13*a* has an annular or substantially annular shape centered on the motor axis J1. The bottom wall portion 13*a* covers the lower side of the speed reduction mechanism 30.

The tube portion 13*b* has a cylindrical or substantially cylindrical shape that protrudes upward from the radial outer edge portion of the bottom wall portion 13*a*. The tube portion 13*b* opens on the upper side. The upper end portion of the tube portion 13*b* is in contact with and fixed to the lower end portion of the case tube portion 12*a*. The protruding tube portion 13*c* has a cylindrical or substantially cylindrical shape that protrudes downward from the radial inner edge portion of the bottom wall portion 13*a*. The protruding tube portion 13*c* opens on both sides in the axial direction.

The second wiring holding portion 15 protrudes radially outward from the tube portion 13*b*. In FIG. 1, the second wiring holding portion 15 protrudes from the tube portion 13*b* toward the same side as the side to which the first wiring holding portion 14 protrudes. The second wiring holding portion 15 is arranged on the lower side of the first wiring holding portion 14. The second wiring holding portion 15 has, for example, a box or substantially box shape that is hollow and opens on the upper side. The inside of the second wiring holding portion 15 is connected to the inside of the tube portion 13*b*. The second wiring holding portion 15 has a bottom wall portion 15*a* and a side wall portion 15*b*. The bottom wall portion 15*a* extends radially outward from the bottom wall portion 13*a*. In FIG. 1, the bottom wall portion 15*a* extends from the bottom wall portion 13*a* toward the same side as the side to which the first wiring holding portion 14 protrudes. The side wall portion 15*b* extends upward from the outer edge portion of the bottom wall portion 15*a*. In the exemplary embodiment of the present disclosure, the bottom wall portion 13*a* and the bottom wall portion 15*a* constitute a bottom 13*j* of the speed reduction mechanism case body 13*i*.

The cylindrical member 16 has a cylindrical or substantially cylindrical shape extending in the axial direction. More specifically, the cylindrical member 16 has a multi-stage cylindrical or substantially multi-stage cylindrical shape centered on the motor axis J1 and opening on both sides in the axial direction. The cylindrical member 16 comprises metal. In the exemplary embodiment of the present disclosure, the cylindrical member 16 comprise sheet metal. Therefore, the cylindrical member 16 is able to be manufactured by pressing a metal plate, and the manufacturing cost of the cylindrical member 16 is able to be reduced. In the exemplary embodiment of the present disclosure, the cylindrical member 16 is a non-magnetic material.

Figure 2:
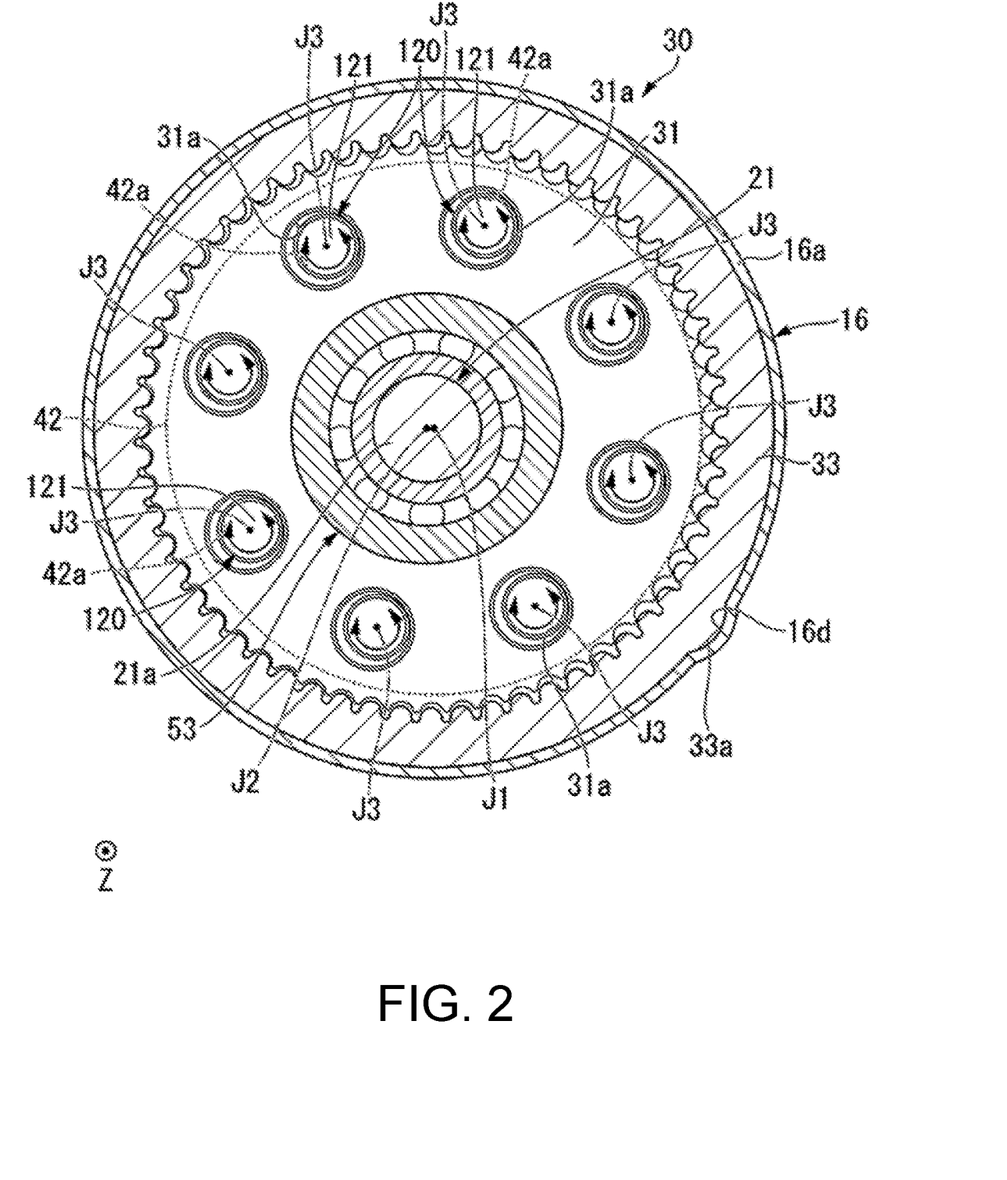
FIG. 2 is a cross sectional view showing a portion of the electric actuator of the first exemplary embodiment of the present disclosure, and is a cross sectional view taken along line II-II in FIG. 1.

The cylindrical member 16 is embedded in the speed reduction mechanism case body 13*i*. The cylindrical member 16 has a large diameter portion 16*a*, an annular portion 16*b*, and a small diameter portion 16*c*. The large diameter portion 16*a* is the upper side portion of the cylindrical member 16. The large diameter portion 16*a* is embedded in the tube portion 13*b*. The upper end portion of the inner peripheral surface of the large diameter portion 16*a* is exposed to the inside of the speed reduction mechanism case 13. As shown in FIG. 2, the large diameter portion 16*a* has a positioning recess 16*d* recessed radially outward on the inner peripheral surface. Moreover, in FIG. 2, the speed reduction mechanism case body 13*i* is not shown.

As shown in FIG. 1, the annular portion 16*b* is the portion that has an annular or substantially annular shape extending radially inward from the lower end portion of the large diameter portion 16a. In the exemplary embodiment of the present disclosure, the annular portion 16b has an annular plate or substantially annular plate shape centered on the motor axis J1. The annular portion 16b is arranged on the bottom wall portion 13a. In the exemplary embodiment of the present disclosure, the annular portion 16b is located on the upper side surface of the bottom wall portion 13a. The radial outer edge portion of the annular portion 16b is embedded in the tube portion 13b. The portion of the upper surface of the annular portion 16b that is closer to the radial inner side is exposed to the inside of the speed reduction mechanism case 13. The annular portion 16b covers the lower side of a first magnet 63 described later. The upper surface of the annular portion 16b is a flat surface orthogonal to the axial direction.

The small diameter portion 16c is the lower side portion of the cylindrical member 16. The small diameter portion 16c extends downward from the radial inner edge portion of the annular portion 16b. The outer diameter and inner diameter of the small diameter portion 16c are smaller than the outer diameter and inner diameter of the large diameter portion 16a. The small diameter portion 16c is fitted into the radial inner side of the protruding tube portion 13c. The bush 54 having a cylindrical or substantially cylindrical shape extending in the axial direction is arranged inside the small diameter portion 16c. The bush 54 is fitted into the small diameter portion 16c and fixed in the protruding tube portion 13c. The bush 54 has a bush flange portion 54a protruding radially outward at the upper end portion. The bush flange portion 54a is in contact with the upper surface of the annular portion 16b. Accordingly, the bush 54 is prevented from falling from the inside of the small diameter portion 16c to the lower side.

The speed reduction mechanism case 13 has a second opening portion 13h that opens on the upper side. In the exemplary embodiment of the present disclosure, the second opening portion 13h is constituted of an upper side opening of the tube portion 13b and an upper side opening of the second wiring holding portion 15. The motor case 12 and the speed reduction mechanism case 13 are fixed to each other with the first opening portion 12g and the second opening portion 13h facing each other in the axial direction. In a state that the motor case 12 and the speed reduction mechanism case 13 are fixed to each other, the inside of the first opening portion 12g and the inside of the second opening portion 13h are connected to each other.

In the exemplary embodiment of the present disclosure, the motor case 12 and the speed reduction mechanism case 13 are provided by, for example, insert molding, respectively. The motor case 12 is provided by insert molding using the metal member 110 and a first wiring member 91 of the wiring members 90 which is described later as insert members. The speed reduction mechanism case 13 is provided by insert molding using the cylindrical member 16 and a second wiring member 92 of the wiring members 90 which is described later as insert members.

The case 11 has a recess 17 located on the outer surface of the case 11. In the exemplary embodiment of the present disclosure, the recess 17 is arranged in the speed reduction mechanism case 13. More specifically, the recess 17 is recessed upward from the lower side surface of the bottom 13j. In the exemplary embodiment of the present disclosure, the recess 17 is arranged over the bottom wall portion 13a and the bottom wall portion 15a. The recess 17 extends in the radial direction.

The bearing holder 100 is fixed to the motor case 12. The bearing holder 100 comprises metal. In the exemplary embodiment of the present disclosure, the bearing holder 100 comprises sheet metal. Therefore, the bearing holder 100 is able to be manufactured by pressing a metal plate, and the manufacturing cost of the bearing holder 100 is able to be reduced. The bearing holder 100 has the tubular holder tube portion 101 and a holder flange portion 102. In the exemplary embodiment of the present disclosure, the holder tube portion 101 has a cylindrical or substantially cylindrical shape centered on the motor axis J1. The holder tube portion 101 holds the first bearing 51 on the radial inner side. The holder tube portion 101 is inserted into the hole portion 12h. The holder tube portion 101 protrudes below the wall portion 12b from the inside of the control board accommodation portion 12f via the hole portion 12h.

The outer diameter of the holder tube portion 101 is smaller than the inner diameter of the hole portion 12h. Therefore, at least a portion of the radial outer side surface of the holder tube portion 101 in the circumferential direction is located at a position separated radially inward from the radial inner side surface of the hole portion 12h. In an example shown in FIG. 1, the radial outer side surface of the holder tube portion 101 is located at a position separated radially inward from the radial inner side surface of the hole portion 12h over the entire circumference.

In the exemplary embodiment of the present disclosure, the holder tube portion 101 has an outer tube portion 101a and an inner tube portion 101b. The outer tube portion 101a has a cylindrical or substantially cylindrical shape extending downward from the radial inner edge portion of the holder flange portion 102. The radial outer side surface of the outer tube portion 101a is the radial outer side surface of the holder tube portion 101. The inner tube portion 101b has a cylindrical or substantially cylindrical shape extending upward from the lower end portion of the outer tube portion 101a on the radial inner side of the outer tube portion 101a. The radial outer side surface of the inner tube portion 101b is in contact with the radial inner side surface of the outer tube portion 101a. In this way, the strength of the holder tube portion 101 is able to be improved by overlapping the two tube portions in the radial direction to constitute the holder tube portion 101. The first bearing 51 is held on the radial inner side of the inner tube portion 101b. The upper end portion of the inner tube portion 101b is located above the first bearing 51. The upper end portion of the inner tube portion 101b is located slightly below the upper end portion of the outer tube portion 101a.

The holder flange portion 102 extends radially outward from the holder tube portion 101. In the exemplary embodiment of the present disclosure, the holder flange portion 102 extends radially outward from the upper end portion of the holder tube portion 101. The holder flange portion 102 has an annular plate or substantially annular plate shape centered on the motor axis J1. The holder flange portion 102 is located on the upper side of the wall portion 12b. The holder flange portion 102 is fixed to the wall portion 12b. Accordingly, the bearing holder 100 is fixed to the motor case 12.

In the exemplary embodiment of the present disclosure, the holder flange portion 102 is fixed to the wall portion 12b by a plurality of screw members that are axially tightened to the wall portion 12b. In the exemplary embodiment of the present disclosure, the screw member for fixing the holder flange portion 102 is tightened to the female screw portion of the metal member 110 of the wall portion 12b. Although not shown, for example, three screw members for fixing the holder flange portion 102 are arranged.

The holder flange portion 102 fixed by the screw members is in contact with the upper side surface of the metal member 110. More specifically, on the lower side surface of the holder flange portion 102, the peripheral edge portion of a penetrating portion through which the screw member penetrates is in contact with the upper side surface of the metal member 110. The holder flange portion 102 is located at a position separated from the wall body 12i to the upper side. Therefore, the holder flange portion 102 is able to be precisely positioned in the axial direction by the metal member 110. In addition, the inclination of the holder flange portion 102 with respect to the axial direction is able to be suppressed. In addition, the holder flange portion 102 does not come into direct contact with the wall body 12i. Therefore, the application of stress to the wall body 12i is able to be suppressed even when there is a difference in the amount of thermal deformation between the wall body 12i comprising resin and the metal member 110 comprising metal due to a difference in coefficient of linear expansion. Accordingly, it is possible to prevent the wall body 12i from being damaged and the metal member 110 from falling out from the wall body 12i.

The motor 20 has a motor shaft 21, a rotor body 22, and the stator 23. The motor shaft 21 is rotatable about the motor axis J1. The motor shaft 21 is supported by the first bearing 51 and the second bearing 52 in a manner of being rotatable around the motor axis J1. The first bearing 51 is held by the bearing holder 100 and supports the portion of the motor shaft 21 that is above the rotor body 22 to be rotatable. The second bearing 52 supports the portion of the motor shaft 21 that is below the rotor body 22 to be rotatable with respect to the speed reduction mechanism case 13.

The upper end portion of the motor shaft 21 passes through the hole portion 12h and protrudes above the wall portion 12b. The motor shaft 21 has an eccentric axis portion 21a centered on an eccentric axis J2 that is eccentric with respect to the motor axis J1. The eccentric axis J2 is parallel to the motor axis J1. The eccentric axis portion 21a is located below the rotor body 22. The inner ring of the third bearing 53 is fitted and fixed to the eccentric axis portion 21a. Accordingly, the third bearing 53 is fixed to the motor shaft 21.

The rotor body 22 is fixed to the motor shaft 21. Although not shown, the rotor body 22 has a cylindrical rotor core fixed to the outer peripheral surface of the motor shaft 21 and a rotor magnet fixed to the rotor core. The stator 23 faces the rotor body 22 in the radial direction via a gap. The stator 23 surrounds the rotor body 22 on the radial outer side of the rotor body 22. The stator 23 has an annular stator core 24 that surrounds the radial outer side of the rotor body 22, an insulator 25 mounted on the stator core 24, and a plurality of coils 26 mounted on the stator core 24 via the insulator 25. The stator core 24 is fixed to the inner peripheral surface of the case tube portion 12a. Accordingly, the stator 23 is held in the motor case 12.

The control portion 70 has the control board 71, a second mounting member 73, a second magnet 74, and a second rotation sensor 72. The control board 71 has a plate or substantially plate shape extending in a plane orthogonal to the axial direction. The control board 71 is accommodated in the motor case 12. More specifically, the control board 71 is accommodated in the control board accommodation portion 12f and is arranged so as to be separated upward from the wall portion 12b. The control board 71 is a board electrically connected to the motor 20. A coil 26 of the stator 23 is electrically connected to the control board 71. The control board 71 controls, for example, current supplied to the motor 20. For example, an inverter circuit is mounted on the control board 71.

The second mounting member 73 has an annular or substantially annular shape centered on the motor axis J1. The inner peripheral surface of the second mounting member 73 is fixed to the upper end portion of the motor shaft 21. The second mounting member 73 is arranged on the upper side of the first bearing 51 and the bearing holder 100. The second mounting member 73 is, for example, a non-magnetic material.

Moreover, the second mounting member 73 may be a magnetic material.

The second magnet 74 has an annular or substantially annular shape centered on the motor axis J1. The second magnet 74 is fixed to the upper end surface of the radial outer edge portion of the second mounting member 73. The method of fixing the second magnet 74 to the second mounting member 73 is not particularly limited and is, for example, adhesion with an adhesive. The second mounting member 73 and the second magnet 74 rotate together with the motor shaft 21. The second magnet 74 is arranged on the upper side of the first bearing 51 and the holder tube portion 101. The second magnet 74 has a north pole and a south pole that are alternately arranged along the circumferential direction.

The second rotation sensor 72 is a sensor that detects the rotation of the motor 20. The second rotation sensor 72 is attached to the lower surface of the control board 71. The second rotation sensor 72 faces the second magnet 74 in the axial direction via a gap. The second rotation sensor 72 detects a magnetic field generated by the second magnet 74. The second rotation sensor 72 is, for example, a Hall element. Although not shown, a plurality of second rotation sensors 72, for example, three second rotation sensors 72 are arranged along the circumferential direction. The second rotation sensor 72 is able to detect rotation of the motor shaft 21 by detecting a change in the magnetic field generated by the second magnet 74 that rotates together with the motor shaft 21.

The connector portion 80 is a portion for connecting to an electric wire outside the case 11. The connector portion 80 is arranged in the motor case 12. The connector portion 80 has the terminal holding portion 12d described above and the terminal 81. The terminal 81 is embedded and held in the terminal holding portion 12d. One end of the terminal 81 is fixed to the control board 71. The other end of the terminal 81 is exposed to the outside of the case 11 via the inside of the terminal holding portion 12d. In the exemplary embodiment of the present disclosure, the terminal 81 is, for example, a bus bar.

An external power supply is connected to the connector portion 80 via an electric wire (not shown). More specifically, an external power supply is attached to the terminal holding portion 12d, and the electric wire of the external power supply is electrically connected to a portion of the terminal 81 protruding into the terminal holding portion 12d. Accordingly, the terminal 81 electrically connects the control board 71 and the electric wire. Therefore, in the exemplary embodiment of the present disclosure, power is supplied from the external power supply to the coil 26 of the stator 23 via the terminal 81 and the control board 71.

The speed reduction mechanism 30 is arranged on the radial outer side of the lower side portion of the motor shaft 21. The speed reduction mechanism 30 is accommodated inside the speed reduction mechanism case 13. The speed reduction mechanism 30 is arranged between the bottom wall portion 13a and annular portion 16b and the motor 20 in the axial direction. The speed reduction mechanism 30 has an externally toothed gear 31, an internally toothed gear 33, an output flange portion 42, and a plurality of column members 120.

The externally toothed gear 31 has a substantially annular plate shape extending in a plane orthogonal to the axial direction with the eccentric axis J2 of the eccentric axis portion 21*a* as the center. As shown in FIG. 2, a gear portion is arranged on the radial outer side surface of the externally toothed gear 31. The externally toothed gear 31 is connected to the eccentric axis portion 21*a* via the third bearing 53. Accordingly, the speed reduction mechanism 30 is connected to the motor shaft 21. More specifically, the speed reduction mechanism 30 is connected to the lower side portion of the motor shaft 21. The externally toothed gear 31 is fitted to the outer ring of the third bearing 53 from the radial outer side. Accordingly, the motor shaft 21 and the externally toothed gear 31 are connected by the third bearing 53 so as to be relatively rotatable around the eccentric axis J2.

The externally toothed gear 31 has a plurality of hole portions 31*a* recessed upward from the lower side surface of the externally toothed gear 31. In the exemplary embodiment of the present disclosure, the hole portions 31*a* penetrate the externally toothed gear 31 in the axial direction. The plurality of hole portions 31*a* are arranged so as to surround the motor axis J1. More specifically, the plurality of hole portions 31*a* are arranged at equal intervals over one circumference along the circumferential direction centered on the eccentric axis J2. For example, eight hole portions 31*a* are arranged. When viewed along the axial direction, the shape of the hole portion 31*a* is, for example, a circular or substantially circular shape. The inner diameter of the hole portion 31*a* is larger than the outer diameter of the portion of the column member 120 described later that is inserted into the hole portion 31*a*.

The internally toothed gear 33 surrounds the radial outer side of the externally toothed gear 31 and meshes with the externally toothed gear 31. The internally toothed gear 33 has an annular or substantially annular shape centered on the motor axis J1. As shown in FIG. 1, the internally toothed gear 33 is located on the radial inner side of the upper end portion of the cylindrical member 16. In the exemplary embodiment of the present disclosure, the internally toothed gear 33 is fixed to the case 11. More specifically, the internally toothed gear 33 is fixed to the inner peripheral surface of the cylindrical member 16 comprising metal in the speed reduction mechanism case 13. Therefore, it is possible to firmly fix the internally toothed gear 33 to the speed reduction mechanism case 13 while using the speed reduction mechanism case body 13*i* comprising resin. Accordingly, the movement of the internally toothed gear 33 with respect to the speed reduction mechanism case 13 is able to be suppressed, and the displacement of the internally toothed gear 33 is able to be suppressed.

In the exemplary embodiment of the present disclosure, the internally toothed gear 33 is fixed to the inner peripheral surface of the large diameter portion 16*a* by pressing. In this way, the speed reduction mechanism 30 is fixed to the inner peripheral surface of the cylindrical member 16 and is held in the speed reduction mechanism case 13. As shown in FIG. 2, a gear portion is arranged on the inner peripheral surface of the internally toothed gear 33. The gear portion of the internally toothed gear 33 meshes with the gear portion of the externally toothed gear 31. More specifically, the gear portion of the internally toothed gear 33 partially meshes with the gear portion of the externally toothed gear 31.

The internally toothed gear 33 has a positioning protrusion 33*a* that protrudes radially outward. The positioning protrusion 33*a* is fitted into the positioning recess 16*d* which is arranged in the large diameter portion 16*a*. Accordingly, the positioning protrusion 33*a* is prevented from getting caught in the positioning recess 16*d*, and the internally toothed gear 33 is prevented from rotating relative to the cylindrical member 16 in the circumferential direction.

The output flange portion 42 is a portion of the output portion 40. As shown in FIG. 1, the output flange portion 42 is arranged facing the externally toothed gear 31 in the axial direction of the motor axis J1. In the exemplary embodiment of the present disclosure, the output flange portion 42 is located on the lower side of the externally toothed gear 31 and faces the externally toothed gear 31 via a gap. As shown in FIG. 2, the output flange portion 42 has, for example, an annular plate or substantially annular plate shape extending in the radial direction about the motor axis J1. The output flange portion 42 extends radially outward from the upper end portion of an output shaft 41 described later. As shown in FIG. 1, the output flange portion 42 is in contact with the bush flange portion 54*a* from the upper side.

The output flange portion 42 has a plurality of through holes 42*a* that penetrate the output flange portion 42 in the axial direction. As shown in FIG. 2, the plurality of through holes 42*a* are arranged so as to surround the motor axis J1. More specifically, the plurality of through holes 42*a* are arranged at equal intervals over one circumference along the circumferential direction centered on the motor axis J1. For example, eight through holes 42*a* are arranged. When viewed along the axial direction, the shape of the through hole 42*a* is a circular or substantially circular shape. The inner diameter of the through hole 42*a* is larger than the outer diameter of a column member body 121 described later. In the exemplary embodiment of the present disclosure, the output flange portion 42 corresponds to a "facing member".

Figure 3:
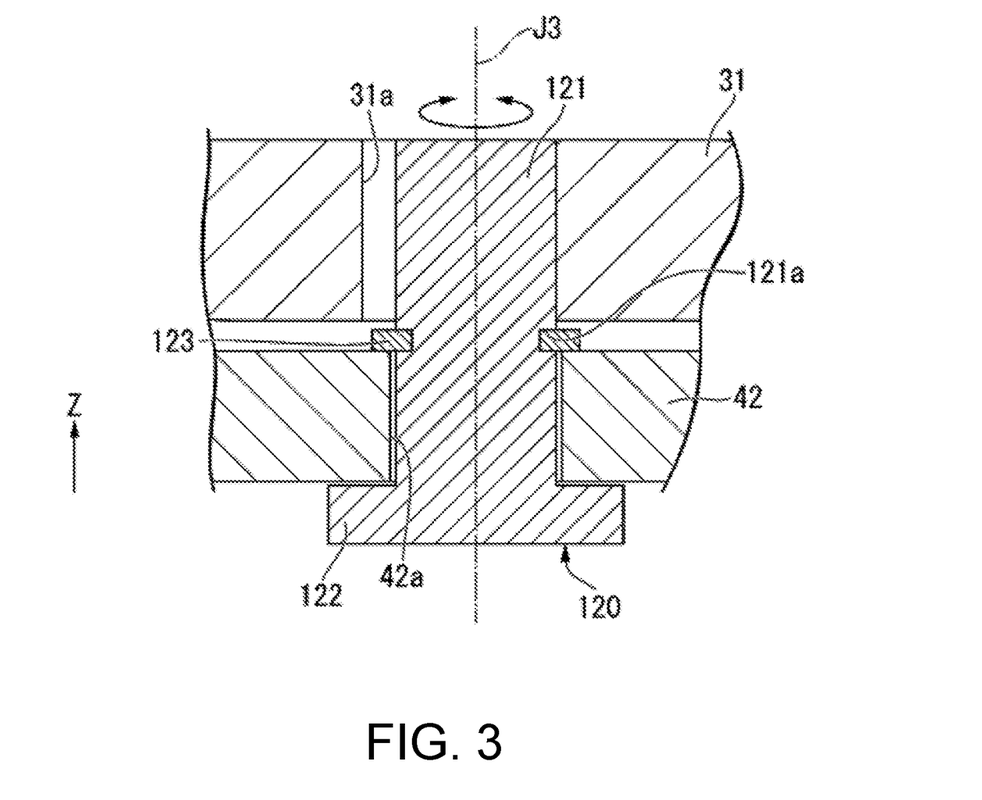
FIG. 3 is a cross sectional view showing a column member of the first exemplary embodiment of the present disclosure.

As shown in FIGS. 2 and 3, the plurality of column members 120 are columnar members extending in the axial direction about a central axis J3. In the exemplary embodiment of the present disclosure, the central axis J3 is parallel to the motor axis J1. The central axis J3 is a central axis of the column member 120. In the exemplary embodiment of the present disclosure, the plurality of column members 120 are passed through each of the plurality of through holes 42*a* and attached to the output flange portion 42. As shown in FIG. 2, the plurality of column members 120 are arranged so as to surround the motor axis J1. More specifically, for example, the plurality of column members 120 are arranged at equal intervals over one circumference along the circumferential direction centered on the motor axis J1. For example, eight column members 120 are arranged.

As shown in FIG. 3, the column member 120 protrudes upward from the output flange portion 42. Accordingly, in the exemplary embodiment of the present disclosure, the column member 120 protrudes from the output flange portion 42 toward the externally toothed gear 31. The plurality of column members 120 are inserted into each of the plurality of hole portions 31*a* from the lower side. The column member 120 has the column member body 121, a first flange portion 122, and a second flange portion 123.

The column member body 121 has a columnar or substantially columnar shape extending in the axial direction about the central axis J3. The outer diameter of the column member body 121 is, for example, the same over the entire axial direction. The outer diameter of the column member body 121 is smaller than the inner diameter of the through hole 42a and the inner diameter of the hole portion 31a. The column member body 121 is arranged so as to penetrate the through hole 42a in the axial direction. The column member body 121 is gap-fitted in the through hole 42a. A slight gap is arranged between the outer peripheral surface of the column member body 121 and the inner peripheral surface of the through hole 42a.

The upper side portion of the column member body 121 protrudes above the through hole 42a. The upper side portion of the column member body 121 is inserted into the hole portion 31a. A gap that allows the column member body 121 to swing along the inner peripheral surface of the hole portion 31a is arranged between the outer peripheral surface of the column member body 121 and the inner peripheral surface of the hole portion 31a. The lower side portion of the column member body 121 is inserted into the through hole 42a except for the lower end portion. The lower end portion of the column member body 121 protrudes below the through hole 42a.

As shown in FIG. 2, the outer peripheral surface of the portion of the column member body 121 that is inserted into the hole portion 31a is inscribed with the inner peripheral surface of the hole portion 31a. The plurality of column member bodies 121 support the externally toothed gear 31 to be swingable around the motor axis J1 via the inner peripheral surface of the hole portion 31a. In other words, the plurality of column members 120 support the externally toothed gear 31 to be swingable around the motor axis J1 via the inner surface of the hole portion 31a.

As shown in FIG. 3, the column member body 121 has a groove 121a on the outer peripheral surface. The groove 121a is recessed inward in the radial direction centered on the central axis J3 from the outer peripheral surface of the column member body 121. The groove 121a has an annular or substantially annular shape centered on the central axis J3. The groove 121a is arranged on the outer peripheral surface of the portion of the column member body 121 that is located above the through hole 42a.

The first flange portion 122 and the second flange portion 123 extend from the column member body 121 toward the outer side in the radial direction centered on the central axis J3. The first flange portion 122 and the second flange portion 123 are arranged so as to sandwich the peripheral edge portion of the through hole 42a of the output flange portion 42 in the axial direction. The axial distance between the first flange portion 122 and the second flange portion 123 is slightly larger than the axial dimension of the portion of the output flange portion 42 that is sandwiched between the first flange portion 122 and the second flange portion 123.

In the exemplary embodiment of the present disclosure, the first flange portion 122 extends from the lower end portion of the column member body 121 toward the outer side in the radial direction centered on the central axis J3. The first flange portion 122 has, for example, an annular or substantially annular shape centered on the central axis J3. The first flange portion 122 is integrally configured with, for example, the column member body 121. The outer diameter of the first flange portion 122 is larger than the inner diameter of the through hole 42a. The first flange portion 122 is located on the lower side of the output flange portion 42. The upper side surface of the first flange portion 122 faces the lower side surface of the output flange portion 42 in the axial direction. In the example of FIG. 3, the upper side surface of the first flange portion 122 is arranged facing the lower side surface of the output flange portion 42 via a slight gap. The upper side surface of the first flange portion 122 may be in contact with the lower side surface of the output flange portion 42.

In the exemplary embodiment of the present disclosure, the second flange portion 123 is a retaining ring that is attached to the column member body 121. The second flange portion 123 is, for example, a C-shaped retaining ring or a substantially C-shaped retaining ring that surrounds the column member body 121. The outer diameter of the second flange portion 123 is, for example, smaller than the outer diameter of the first flange portion 122. The second flange portion 123 is fitted into the groove 121a of the column member body 121 and attached to the column member body 121.

The second flange portion 123 is located above the through hole 42a of the column member body 121. The second flange portion 123 is located on the upper side of the output flange portion 42. The lower side surface of the second flange portion 123 faces the upper side surface of the output flange portion 42 in the axial direction. In the example of FIG. 3, the lower side surface of the second flange portion 123 is in contact with the upper side surface of the output flange portion 42. The lower side surface of the second flange portion 123 may be arranged facing the upper side surface of the output flange portion 42 via a slight gap.

At least one of the plurality of column members 120 is attached to the output flange portion 42 in a manner of being rotatable around the central axis J3 of the column member 120. As shown in FIG. 2, in the exemplary embodiment of the present disclosure, each of the plurality of column members 120 is attached to the output flange portion 42 in a manner of being rotatable around the central axis J3 of each column member 120.

The output portion 40 is a portion that outputs a driving force of the electric actuator 10. The rotation of the motor shaft 21 is transmitted to the output portion 40 via the speed reduction mechanism 30. As shown in FIG. 1, the output portion 40 is accommodated in the speed reduction mechanism case 13. The output portion 40 has the output shaft 41 and the output flange portion 42. In the exemplary embodiment of the present disclosure, the output portion 40 is a single member.

The output shaft 41 extends in the axial direction of the motor shaft 21 on the lower side of the motor shaft 21. The output shaft 41 has a cylindrical portion 41a and an output shaft body portion 41b. The cylindrical portion 41a has a cylindrical or substantially cylindrical shape extending downward from the inner edge of the output flange portion 42. The cylindrical portion 41a has a cylindrical or substantially cylindrical shape that has a bottom and opens on the upper side. The cylindrical portion 41a is fitted to the radial inner side of the bush 54. Accordingly, the output shaft 41 is rotatably supported by the cylindrical member 16 via the bush 54. As described above, the speed reduction mechanism 30 is fixed to the cylindrical member 16. Therefore, both the speed reduction mechanism 30 and the output shaft 41 is able to be supported by the cylindrical member 16 comprising metal. Accordingly, the speed reduction mechanism 30 and the output shaft 41 is able to be arranged with high precision of axis.

The second bearing 52 is accommodated in the cylindrical portion 41a. The outer ring of the second bearing 52 is fitted inside the cylindrical portion 41a. Accordingly, the second bearing 52 connects the motor shaft 21 and the output shaft 41 in a relatively rotatable manner. The lower end portion of the motor shaft 21 is located inside the cylindrical portion 41a. The lower end surface of the motor shaft 21 faces the upper surface of the bottom of the cylindrical portion 41a via a gap.

The output shaft body portion 41b extends downward from the bottom of the cylindrical portion 41a. In the exemplary embodiment of the present disclosure, the output shaft body portion 41b has a columnar or substantially columnar shape centered on the motor axis J1. The outer diameter of the output shaft body portion 41b is smaller than the outer diameter and inner diameter of the cylindrical portion 41a. The lower end portion of the output shaft body portion 41b protrudes below the protruding tube portion 13c. Another member to which the driving force of the electric actuator 10 is output is attached to the lower end portion of the output shaft body portion 41b.

When the motor shaft 21 is rotated around the motor axis J1, the eccentric axis portion 21a revolves about the motor axis J1 in the circumferential direction. The revolution of the eccentric axis portion 21a is transmitted to the externally toothed gear 31 via the third bearing 53, and the externally toothed gear 31 swings while the inscribed position between the inner peripheral surface of the hole portion 31a and the outer peripheral surface of the column member 120 is changed. Accordingly, the position where the gear portion of the externally toothed gear 31 and the gear portion of the internally toothed gear 33 mesh with each other changes in the circumferential direction. Therefore, the rotational force of the motor shaft 21 is transmitted to the internally toothed gear 33 via the externally toothed gear 31.

Here, in the exemplary embodiment of the present disclosure, the internally toothed gear 33 does not rotate because it is fixed to the case 11. Therefore, the externally toothed gear 31 rotates around the eccentric axis J2 by the reaction force of the rotational force transmitted to the internally toothed gear 33. At this time, the rotation direction of the externally toothed gear 31 is opposite to the rotation direction of the motor shaft 21. The rotation of the externally toothed gear 31 around the eccentric axis J2 is transmitted to the output flange portion 42 via the hole portion 31a and the column member 120. Accordingly, the output shaft 41 rotates around the motor axis J1. In this way, the rotation of the motor shaft 21 is transmitted to the output shaft 41 via the speed reduction mechanism 30.

The rotation of the output shaft 41 is decelerated by the speed reduction mechanism 30 with respect to the rotation of the motor shaft 21. According to the speed reduction mechanism 30 of the exemplary embodiment of the present disclosure, the reduction ratio of the rotation of the output shaft 41 to the rotation of the motor shaft 21 is able to be relatively large. Therefore, the rotational torque of the output shaft 41 is able to be relatively large.

The wiring member 90 is electrically connected to a first rotation sensor 61 described later. In the exemplary embodiment of the present disclosure, the wiring member 90 is a member for connecting the first rotation sensor 61 of the rotation detection device 60 and the control board 71 of the control portion 70. In the exemplary embodiment of the present disclosure, the wiring member 90 is an elongated plate-shaped bus bar or an elongated substantially plate-shaped bus bar. Although not shown, three wiring members 90 are arranged in the exemplary embodiment of the present disclosure. Each of the wiring members 90 is configured by connecting the first wiring member 91 and the second wiring member 92.

The first wiring member 91 extends from the inside of the second wiring holding portion 15 to the inside of the control board accommodation portion 12f. A portion of the first wiring member 91 is embedded in the first wiring holding portion 14, the case tube portion 12a, and the wall body 12i. Accordingly, the first wiring member 91 is held in the motor case 12.

A lower end portion 91a of the first wiring member 91 protrudes downward from the first wiring holding portion 14 and is located inside the second wiring holding portion 15. An upper end portion 91b of the first wiring member 91 protrudes upward from the wall body 12i and is connected to the control board 71. Accordingly, the first wiring member 91 is electrically connected to the control board 71, and is electrically connected to the electric wire outside the case 11 via the connector portion 80.

A portion of the second wiring member 92 is embedded in the bottom 13j. Accordingly, the second wiring member 92 is held in the speed reduction mechanism case 13. An upper end portion 92a of the second wiring member 92 protrudes upward from the bottom wall portion 15a. The upper end portion 92a of the second wiring member 92 is connected to the lower end portion 91a of the first wiring member 91. A lower end portion 92b of the second wiring member 92 penetrates the bottom 13j and protrudes into the recess 17. Accordingly, the wiring member 90 penetrates the case 11 from the inside of the case 11, and one end portion of the wiring member 90 protrudes into the recess 17.

The rotation detection device 60 detects the rotation of the output portion 40. The rotation detection device 60 has a first magnet 63, a covering portion 62, and the first rotation sensor 61. The first magnet 63 has an annular or substantially annular shape centered on the motor axis J1. The first magnet 63 is attached to the output portion 40. The first magnet 63 is located on the lower side of the column member 120. The lower end portion of the first magnet 63 faces the upper side of the annular portion 16b via a gap.

The first rotation sensor 61 is located inside the recess 17. The first rotation sensor 61 is located on the lower side of the first magnet 63 so as to sandwich the annular portion 16b. The first rotation sensor 61 is a magnetic sensor that detects a magnetic field generated by the first magnet 63. The first rotation sensor 61 is, for example, a Hall element. By detecting a change in the magnetic field generated by the first magnet 63 that rotates together with the output portion 40, the first rotation sensor 61 is able to detect the rotation of the output portion 40. Here, according to the exemplary embodiment of the present disclosure, the cylindrical member 16 is a non-magnetic material. Therefore, even if the cylindrical member 16 is located between the first magnet 63 and the first rotation sensor 61, a decrease in the detection precision of the magnetic field of the first magnet 63 by the first rotation sensor 61 is able to be suppressed.

The covering portion 62 is located inside the recess 17. In the exemplary embodiment of the present disclosure, the covering portion 62 is filled inside the recess 17. The covering portion 62 comprises resin. The lower end portion 92b of the second wiring member 92, that is, one end portion of the wiring member 90 and the first rotation sensor 61 are embedded in and covered by the covering portion 62. Therefore, it is possible to prevent moisture or the like from coming into contact with one end portion of the wiring member 90 and the first rotation sensor 61 located in the recess 17.

As described above, when rotation is transmitted from the externally toothed gear 31 to the output flange portion 42, the externally toothed gear 31 swings and the position where the outer peripheral surface of the column member 120 contacts the inner peripheral surface of the hole portion 31a is changed. Here, the greatest force is applied between the outer peripheral surface of the column member 120 and the inner peripheral surface of the hole portion 31a when advancing the meshing between the teeth of the externally toothed gear 31 and the teeth of the internally toothed gear 33. At this time, in the conventional configuration, the position of the outer peripheral surface of the column member that contacts the inner peripheral surface of the hole portion 31a is always the same, and partial wear of the outer peripheral surface of the column member is prone to occur. When partial wear of the outer peripheral surface of the column member occurs, for example, the shape of the column member when viewed in the axial direction is close to an elliptical or substantially elliptical shape. In this case, failures such as a decrease in the transmission efficiency of torque by the speed reduction mechanism and a decrease in the precision of the rotation angle of the output portion via the speed reduction mechanism may occur.

In contrast, according to the exemplary embodiment of the present disclosure, at least one of the plurality of column members 120 is attached to the output flange portion 42 in a manner of being rotatable around the central axis J3 of the column member 120. Therefore, when the rotation of the motor shaft 21 is transmitted to the output flange portion 42 via the externally toothed gear 31, for example, when a frictional force is generated between the outer peripheral surface of the column member 120 and the inner peripheral surface of the hole portion 31a, the column member 120 rotates around the central axis J3. Accordingly, rubbing between the outer peripheral surface of the column member 120 and the inner peripheral surface of the hole portion 31a is able to be suppressed. Therefore, the wear of the column member 120 is able to be suppressed. In addition, the wear of the inner peripheral surface of the hole portion 31a is also able to be suppressed. In addition, even when the outer peripheral surface of the column member 120 rubs against the inner peripheral surface of the hole portion 31a, the position of the outer peripheral surface of the column members 120 when it comes into relatively strong contact with the inner peripheral surface of the hole portion 31a is able to be changed by rotating the column members 120. Therefore, it is possible to prevent the same position of the outer peripheral surface of the column member 120 from continuing to rub relatively strongly. Accordingly, the wear of the column member 120 is able to be suppressed. Therefore, the occurrence of failures such as a decrease in the transmission efficiency of torque, a decrease in the precision of the rotation angle of the output portion 40 in the speed reduction mechanism 30, and the like is able to be suppressed.

In addition, according to the exemplary embodiment of the present disclosure, each of the plurality of column members 120 is attached to the output flange portion 42 in a manner of being rotatable around the central axis J3 of each column member 120. Therefore, as described above, the wear of each column member 120 is able to be suppressed. Therefore, the occurrence of failures in the speed reduction mechanism 30 is able to be further suppressed.

In addition, according to the exemplary embodiment of the present disclosure, the column member 120 has the column member body 121 that is gap-fitted in the through hole 42a arranged in the output flange portion 42, and the first flange portion 122 and the second flange portion 123 extending from the column member body 121 toward the outer side in the radial direction centered on the central axis J3. The first flange portion 122 and the second flange portion 123 are arranged so as to sandwich the peripheral edge portion of the through hole 42a of the output flange portion 42 in the axial direction of the motor axis J1. Therefore, the first flange portion 122 and the second flange portion 123 is able to prevent the column member 120 from falling out from the output flange portion 42 in the axial direction. In addition, the column member body 121 is gap-fitted in the through hole 42a, and thus is able to rotate around the central axis J3 in the through hole 42a. Therefore, the column member 120 is able to be easily attached to the output flange portion 42 in a state that the column member 120 is able to rotate around the central axis J3.

In addition, according to the exemplary embodiment of the present disclosure, the second flange portion 123 is a retaining ring attached to the column member body 121. Therefore, an assembly method is able to be adopted in which the second flange portion 123 is attached to the column member body 121 as a retainer after the column member body 121 is passed through the through hole 42a from the lower side. Accordingly, the column member 120 is able to be more easily attached to the output flange portion 42.

In addition, according to the exemplary embodiment of the present disclosure, the facing member arranged facing the externally toothed gear 31 in the axial direction is the output flange portion 42 arranged in the output portion 40. Therefore, the output portion 40 is able to be arranged at a position facing the externally toothed gear 31 in the axial direction. Accordingly, it is easy to adopt a configuration in which the motor shaft 21 and the output shaft 41 are arranged side by side in the axial direction as in the exemplary embodiment of the present disclosure.

Figure 4:
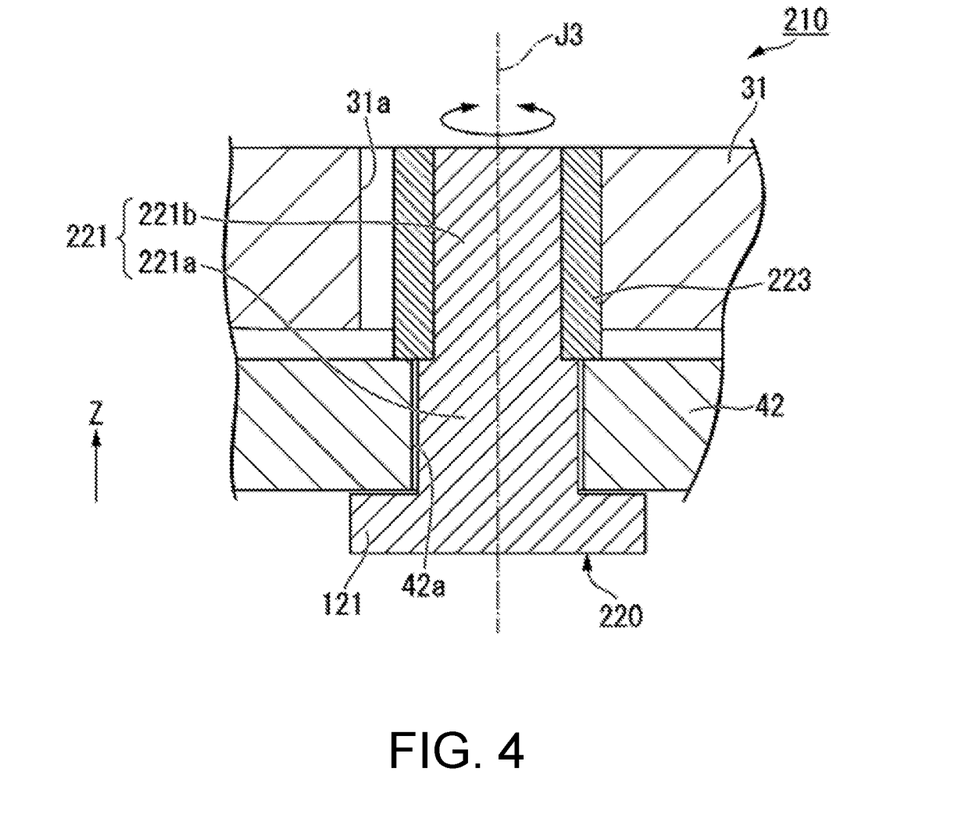
FIG. 4 is a cross sectional view showing a column member of a second exemplary embodiment of the present disclosure.

As shown in FIG. 4, in an electric actuator 210 of the exemplary embodiment of the present disclosure, a column member body 221 of a column member 220 has a large diameter portion 221a and a small diameter portion 221b. The large diameter portion 221a is a lower side portion of the column member body 221. The large diameter portion 221a is gap-fitted in the through hole 42a. The small diameter portion 221b is an upper side portion of the column member body 221. The outer diameter of the small diameter portion 221b is smaller than the outer diameter of the large diameter portion 221a. The small diameter portion 221b is connected to the upper side of the large diameter portion 221a via a step. The small diameter portion 221b protrudes above the through hole 42a. The small diameter portion 221b is inserted into the hole portion 31a of the externally toothed gear 31.

In the exemplary embodiment of the present disclosure, a second flange portion 223 is a tube member fixed to a portion of the column member body 221 that protrudes toward the externally toothed gear 31. In the exemplary embodiment of the present disclosure, the portion of the column member body 221 that protrudes toward the externally toothed gear 31 is the small diameter portion 221b that protrudes above the through hole 42a. The second flange portion 223 has a cylindrical or substantially cylindrical shape centered on the central axis J3 and opening on both sides in the axial direction. The second flange portion 223 is fitted to the small diameter portion 221b. The second flange portion 223 is fixed to the small diameter portion 221b by, for example, pressing. That is, for example, the small diameter portion 221b is pressed into the second flange portion 223. The inner peripheral surface of the second flange portion 223 is in contact with the outer peripheral surface of the small diameter portion 221b.

The lower end portion of the second flange portion 223 is in contact with the step between the small diameter portion 221b and the large diameter portion 221a from the upper side. The axial position at the upper end portion of the second flange portion 223 is, for example, the same as the axial position at the upper end portion of the small diameter portion 221b. The second flange portion 223 serving as a tube member is inserted into the hole portion 31a and supports the externally toothed gear 31 to be swingable around the motor axis J1 via the inner side surface of the hole portion 31a. The outer peripheral surface of the second flange portion 223 is inscribed with the inner peripheral surface of the hole portion 31a.

By sandwiching the output flange portion 42 between the first flange portion 122 and the second flange portion 223 in the axial direction, the column member 220 is prevented from falling out from the through hole 42a in the axial direction. Other configurations of the exemplary embodiment of the present disclosure is able to be the same as other configurations of the first exemplary embodiment of the present disclosure.

According to the exemplary embodiment of the present disclosure, the second flange portion 223 is separate from the column member body 221 and the outer peripheral surface of the second flange portion 223 is in contact with the inner peripheral surface of the hole portion 31a. Therefore, the material constituting the portion of the column member 220 that is in contact with the inner peripheral surface of the hole portion 31a is able to be different from the material constituting the column member body 221. Accordingly, for example, the material constituting the column member body 221 is able to be a relatively inexpensive material, and the material constituting the second flange portion 223 is able to be a material having a relatively small coefficient of friction with the inner peripheral surface of the hole portion 31a. Accordingly, an increase in the manufacturing cost of the electric actuator 210 is able to be suppressed, and the wear of the column member 220 is able to be further suppressed.

In addition, the material constituting the column member body 221 is able to be a material that is relatively easy to process, and the material constituting the second flange portion 223 is able to be a material having relatively high strength. Accordingly, an increase in working hours and time required for manufacturing the electric actuator 210 is able to be suppressed, and the wear of the column member 220 is able to be further suppressed.

The disclosure is not limited to the exemplary embodiments of the present disclosure described above, and other configurations and methods may also be adopted within the scope of the technical idea of the disclosure. The plurality of column members may protrude from one member of the facing member and the externally toothed gear toward the other member. In the exemplary embodiments of the present disclosure described above, the output flange portion 42 serving as a facing member is used as one member, and the externally toothed gear 31 is used as the other member, but the disclosure is not limited thereto. The plurality of column members may protrude from the externally toothed gear toward the facing member. In this case, the plurality of hole portions are arranged on the facing member. For example, in the first exemplary embodiment of the present disclosure, the plurality of column members 120 may protrude downward from the externally toothed gear 31 toward the output flange portion 42. In this case, a plurality of hole portions into which the plurality of column members 120 are respectively inserted are arranged in the output flange portion 42.

Some of the plurality of column members may be fixed to the attached member so as not to be rotatable around the central axis of the column member. The method of attaching the column member to one member to be rotatable around the central axis is not particularly limited. For example, the column member may be fixed to the inner ring of the ball bearing embedded in the member to which the column member is attached.

Both the first flange portion and the second flange portion may be retaining rings attached to the column member body. The type of the retaining ring is not particularly limited. The retaining ring serving as the first flange portion or the second flange portion may be, for example, an E-shaped retaining ring or a substantially E-shaped retaining ring. The first flange portion may be a tube member inserted into the hole portion. The first flange portion and the second flange portion may not be arranged.

The facing member may not be arranged in the output portion. In this case, for example, the facing member may be fixed to the case, and the internally toothed gear may not be fixed to the case. In this case, the rotation of the motor shaft is transmitted to the internally toothed gear via the externally toothed gear. In this case, the internally toothed gear may be a portion of the output portion.

The application of the electric actuator to which the disclosure is applied is not particularly limited. The electric actuator may be mounted on a shift-by-wire actuator device driven based on a shift operation of a driver. In addition, the electric actuator may be mounted on a device other than a vehicle. Moreover, as described above, the configurations described in the specification is able to be combined as appropriate within a range in which the configurations do not contradict each other.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric actuator, comprising:
a motor comprising a motor shaft that is rotatable about a motor axis;
a speed reduction mechanism connected to the motor shaft; and
a bearing fixed to the motor shaft,
wherein the motor shaft comprises an eccentric axis portion centered on an eccentric axis that is eccentric with respect to the motor axis,
the speed reduction mechanism comprises:
an externally toothed gear connected to the eccentric axis portion via the bearing;
an internally toothed gear that surrounds a radial outer side of the externally toothed gear and meshes with the externally toothed gear;
an output flange portion arranged facing the externally toothed gear in an axial direction of the motor axis; and
a plurality of column members arranged so as to protrude from one member of the output flange portion and the externally toothed gear toward the other member and surround the motor axis,
the other member comprises a plurality of hole portions arranged so as to surround the motor axis,
the plurality of column members are inserted into the plurality of hole portions respectively, and support the externally toothed gear to be swingable around the motor axis via an inner side surface of each of the hole portions, and at least one of the plurality of column members is attached to the one member in a manner of being rotatable around a central axis of the at least one column member.

2. The electric actuator according to claim 1, wherein each of the plurality of column members is attached to the one member in a manner of being rotatable around the central axis of each of the column members.

3. The electric motor according to claim 1, wherein the one member comprises a plurality of through holes that penetrate the one member in the axial direction of the motor axis, the plurality of column members are passed through the plurality of through holes respectively and attached to the one member, each of the column members comprises:
a column member body arranged through the through hole and gap-fitted in the through hole; and
a first flange portion and a second flange portion extending from the column member body toward an outer side in a radial direction centered on the central axis, and the first flange portion and the second flange portion are arranged so as to sandwich a peripheral edge portion of the through hole of the one member in the axial direction of the motor axis.

4. The electric actuator according to claim 3, wherein at least one of the first flange portion and the second flange portion is a retaining ring attached to the column member body.

5. The electric actuator according to claim 3, wherein one of the first flange portion and the second flange portion is a tube member fixed to a portion of the column member body that protrudes toward the other member, and the tube member is inserted into the hole portion and supports the externally toothed gear to be swingable around the motor axis via the inner side surface of the hole portion.

6. The electric actuator according to claim 1, further comprising:
a case which accommodates the motor therein; and
an output portion to which rotation of the motor shaft is transmitted via the speed reduction mechanism,
wherein the internally toothed gear is fixed to the case, and
the output portion comprises the output flange portion.

* * * * *